United States Patent [19]
Sakamaki

[11] Patent Number: 5,734,690
[45] Date of Patent: Mar. 31, 1998

[54] REACTOR-INTERNAL EQUIPMENT HANDLING APPARATUS

[75] Inventor: Kazuo Sakamaki, Yokohama, Japan

[73] Assignee: Kabushiki Kaisha Toshiba, Kawasaki, Japan

[21] Appl. No.: 773,953

[22] Filed: Dec. 26, 1996

[30] Foreign Application Priority Data

Dec. 27, 1995 [JP] Japan .................................. 7-341262

[51] Int. Cl.[6] ................................................ G21C 19/00
[52] U.S. Cl. ...................... 376/260; 376/262; 376/263
[58] Field of Search ............................. 376/260–263, 376/272, 294, 461, 463

[56] References Cited

U.S. PATENT DOCUMENTS

| | | |
|---|---|---|
| 4,272,321 | 6/1981 | Betancourt et al. .................. 376/262 |
| 4,696,786 | 9/1987 | Frizot et al. ...................... 376/260 X |
| 4,981,640 | 1/1991 | Beneck et al. ......................... 376/261 |
| 5,225,150 | 7/1993 | Malandra et al. ...................... 376/263 |

*Primary Examiner*—Michael J. Carone
*Assistant Examiner*—Matthew J. Lattig
*Attorney, Agent, or Firm*—Foley & Lardner

[57] ABSTRACT

The reactor-internal equipment handling apparatus (29) can mount and dismount a reactor-internal equipment (5, 70) to and from the reactor pressure vessel (24) quickly. The reactor-internal equipment handling apparatus for a nuclear reactor, hung down from the above the reactor vessel to handle reactor-internal equipment housed in the reactor vessel, comprises: a body frame (31) hung down from above the reactor vessel; a connecting and fixing section (32, 33, 34) provided for the body frame and adapted to be releasably connected to lugs (25) of the reactor-internal equipment; a circular guide rail (28) disposed on the body frame; and a bolt wrench section (36) disposed movably along the circular guide rail.

18 Claims, 12 Drawing Sheets

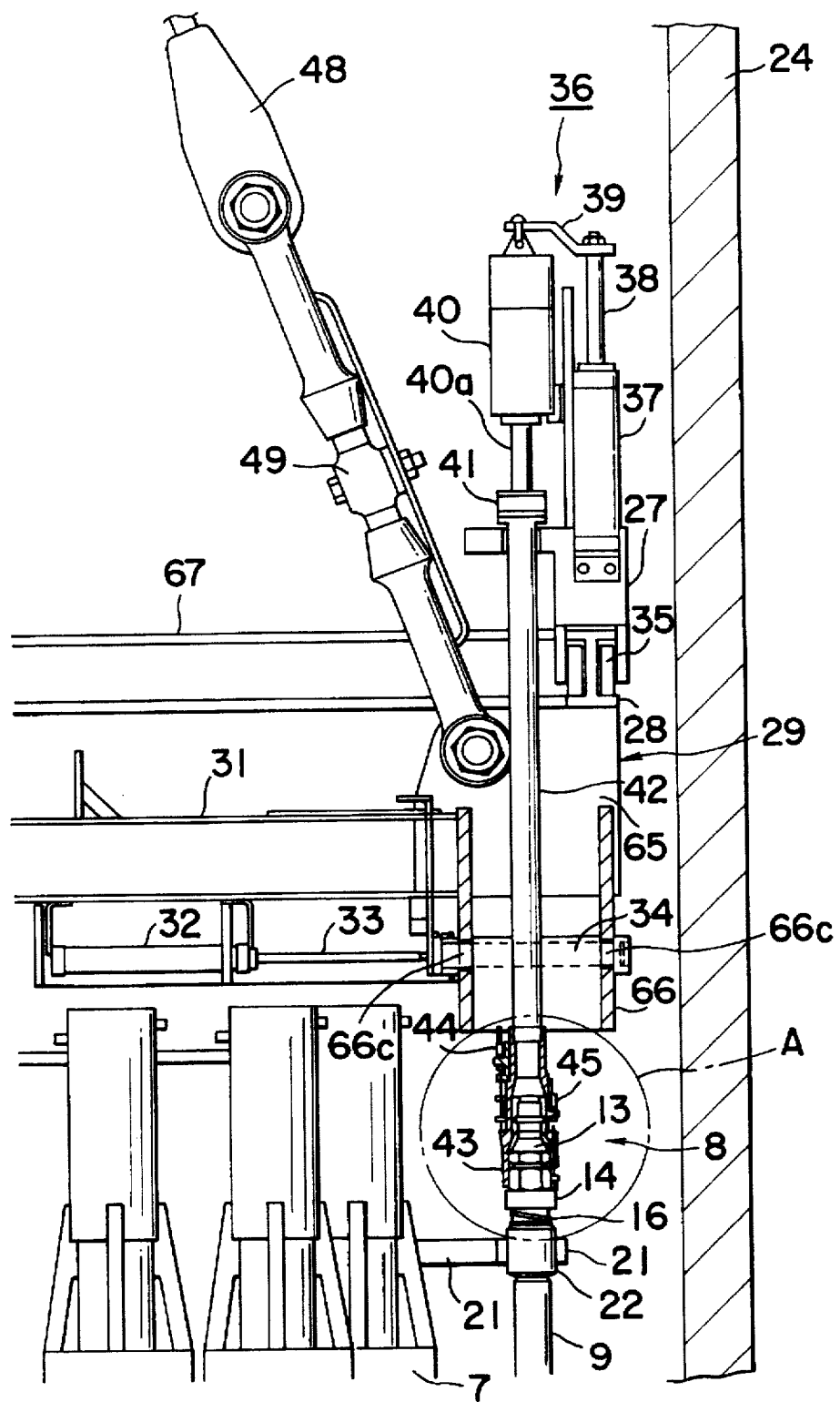
F I G. 3

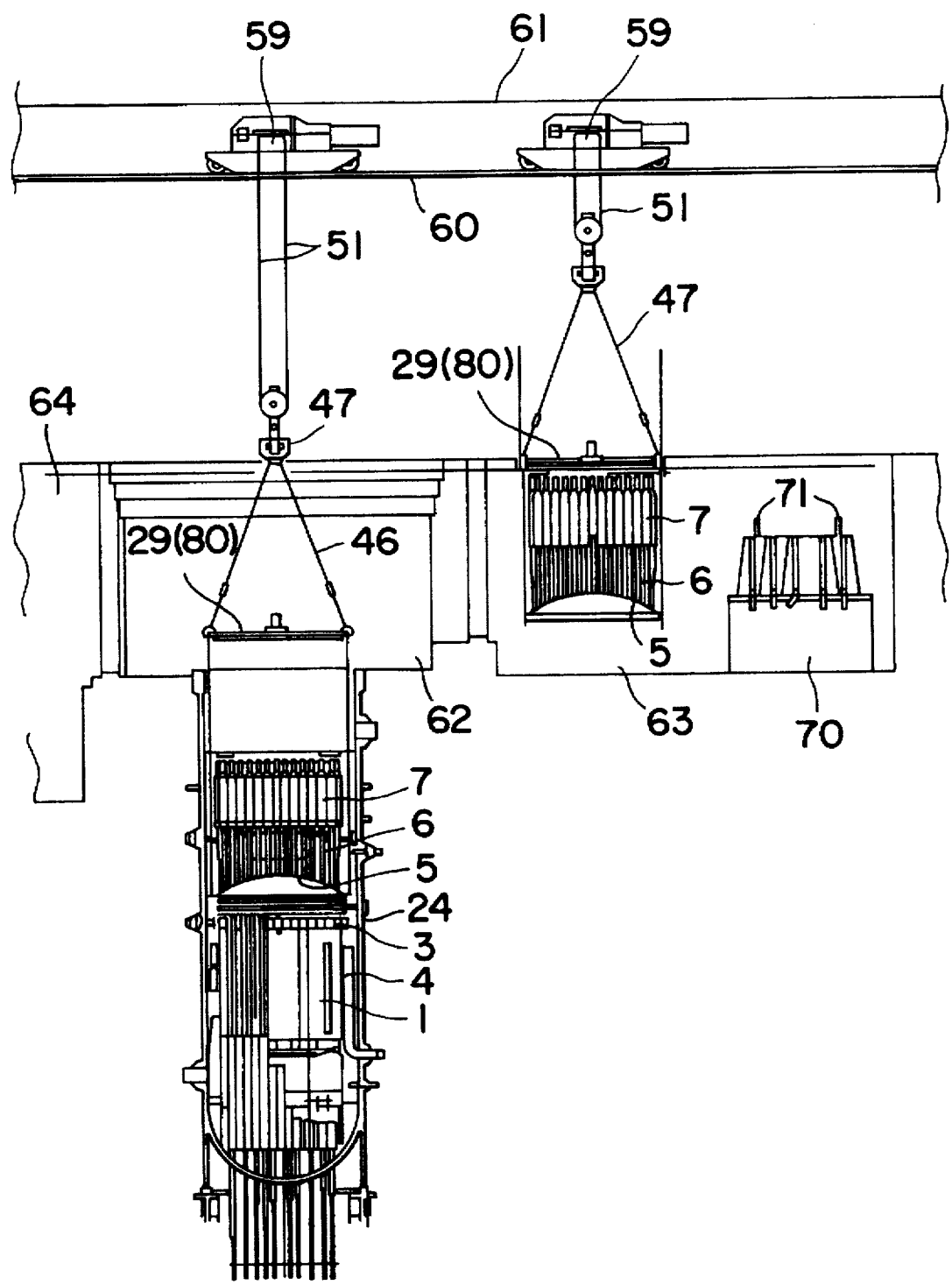
F I G. 6

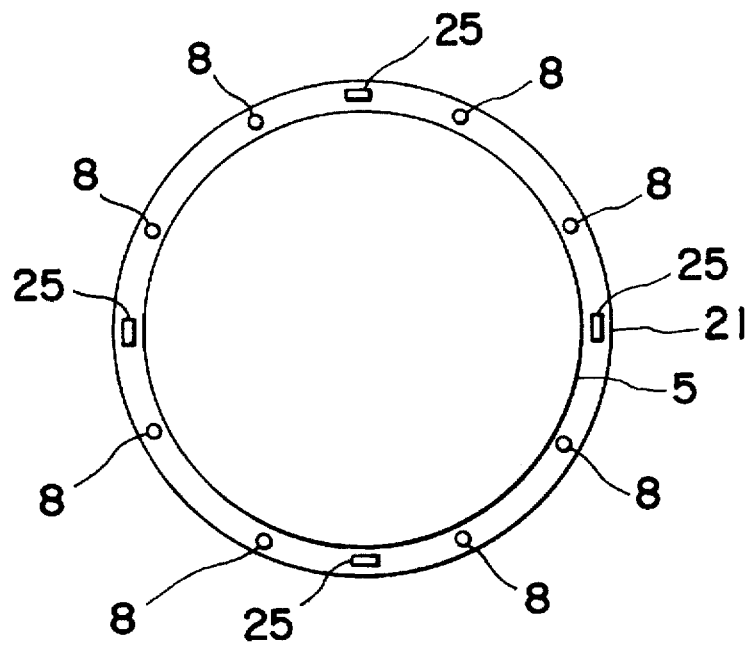
FIG. 11(a)
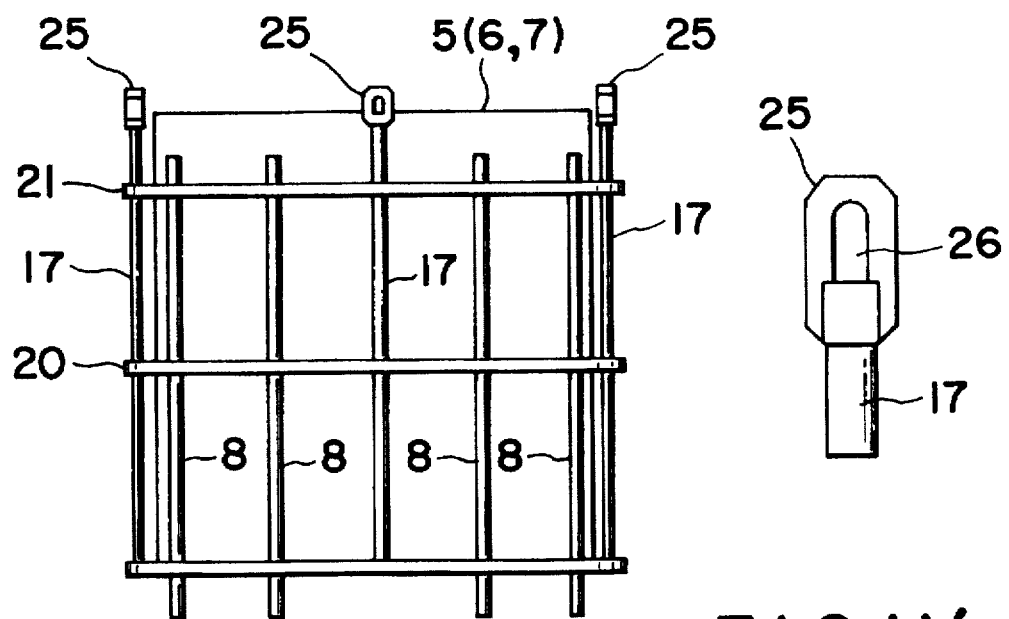
FIG. 11(b)
FIG. 11(c)

REACTOR-INTERNAL EQUIPMENT HANDLING APPARATUS

BACKGROUND OF THE INVENTION

1. Field of the Invention

The present invention relates to a reactor-internal equipment handling apparatus for a nuclear reactor, and more specifically to a reactor-internal equipment handling apparatus hung down from above a reactor vessel to handle reactor-internal equipments mounted in the reactor vessel.

2. Description of the Prior Art

FIG. 9 is a longitudinal sectional view showing various reactor-internal equipments housed within a reactor vessel (reactor pressure vessel) of a boiling water nuclear reactor. As shown, a reactor core 1 composed of a number of fuel assemblies (not shown) is housed inside the reactor vessel of the boiling water reactor. Further, the core 1 is supported by a core support plate 2 on the lower side thereof and by a upper support plate 3 on the upper side thereof, respectively.

The outer circumference of the core 1 is surrounded by a cylindrical core shroud 4, and further the upper portion of the shroud is covered with a shroud head 5 which is one of the reactor-internal equipments. By the shroud head 5, an upper plenum 5a is formed at the upper portion of the core 1. On the upper surface of the shroud head 5, a number of stand pipes 6 are provided to stand close together, and further a number of steam separators 7 are also arranged at the upper portion of the stand pipes 6, respectively. Here, coolant heated by the core 1 flows into a core top plenum 5a as a two phase flow (a mixture flow of steam and water), and the two phase flow is mixed uniformly with each other in the core top plenum 5a. The two phase flow mixed uniformly in the core top plenum 5a is introduced into the steam separators 7 through the stand pipes 6, respectively, to separate the two phase flow into steam and water. The steam separated from the two phase flow by the steam separators 7 is introduced into a steam dryer (not shown) arranged on the upper side of the steam separators 7, to dry the introduced steam.

Further, the boiling water reactor is a nuclear reactor for generating steam by heating and coolent (light water) by unitization of heat generated by nuclear fission reaction within the core 1, so that the pressure and the temperature increase in the surroundings of the core 1 during operation of the nuclear reactor. Therefore, upward pressure is kept applied to the shroud head 5 during nuclear reactor operation. Here, in order to prevent the shroud head 5 from being displaced by the pressure during nuclear reactor operation, the shroud head 5 is fastened and fixed to the upper portion of the core shroud 4 by use of several tens of shroud head bolts 8. Further, since the shroud head 5 is fixed to the core shroud 4, it is possible to prevent the stand pipes 6, the steam separators 7, etc. from falling down in case an earthquake occurs.

FIGS. 10(a) and 10(b) show a structure of the shroud head bolt 8 for fastening the shroud head 5 to the core shroud 4. As shown, each shroud head bolt 8 is provided with a long cylindrical outer pipe 9. Into this outer pipe 9, an inner pipe 10 longer than the outer pipe 9 is inserted so as to be movable up and down. The inner rod 10 is formed by welding an inner rod upper 10a and an inner rod lower 10b integral with each other. The lower portion of the inner rod lower 10b projects downward from a lower end opening of the outer pipe 9, and a T-bar (T-shaped bar) 11 is attached to the lower end of the inner rod lower 10b. The upper surface of the T-bar 11 is engaged to the lower surface of a lower shroud head bolt lug 12.

On the other hand, a nut (e.g., hexagonal nut) 13 is screwed with the upper portion of the inner rod upper 10a. A nut lock 14 is provided below the nut 13 so as to be movable up and down. This nut lock 14 is urged upward by the resilient force of a spring 16 and thereby fitted to corner portions of the nut 13, to prevent the nut 13 from being rotated.

On the lower end of the outer pipe 9, a short cylindrical base 18 formed with a flange 18a is provided. This base 18 is fitted to a lug groove 19a of an upper shroud head bolt lug 19 fixed to the shroud head 5. Further, the lower surface of the flange 18a of the base 18 is engaged to the upper surface of the upper shroud head bolt lug 19.

As shown in FIG. 9, a number of the stand pipes 6 and a number of the steam separators 7 arranged on the upper portion of the shroud head 5 are supported by a lower guide ring 20 and an upper guide ring 21, respectively. Further, the lower guide ring 20 is formed with a number of engage holes 20a, and the upper guide ring 21 is formed with a number of engage holes 21a, respectively. Therefore, the shroud head bolts 8 are passed through these engage holes 20a and 21a of the lower and upper guide rings 20 and 21, respectively. Each shroud bolt 8 is provided with a spacer 23 and a head 22 at positions corresponding to the two engage holes 20a and 21a of the lower and upper guide rings 20 and 21, respectively. These spacer 23 and the head 22 are engaged with the engage holes 20a and 21a of the lower and upper guide rings 20 and 21, respectively.

FIG. 11(a) is a top view showing the shroud head 5, and FIG. 11(b) is a side view showing the shroud head 5. As already described, a number of the shroud head bolts 8 are arranged on the outer circumference of the stand pipes 6, the steam separators 7 and the shroud head 5. These shroud head bolts 8 are inserted into the engage holes 20a and 21a (as shown in FIG. 10) of the lower and upper guide rings 20 and 21, respectively. Further, four rods 17 are arranged at 90 degree angular intervals on the outer circumference of the shroud head 5, the stand pipes 6 and the steam separators 7. Further, a hanging lug 25 as shown in FIG. 11(c) is provided on the upper end of each rod 17. The handing lug 25 is formed with a hanging hole 26 engaged with a hook of a shroud head hanging member (not shown) used to hoist the shroud 5 from the reactor pressure vessel. Further, in FIG. 11(a), although the four rods 17 each having the hanging lug 25 are arranged at 90 degrees angular intervals, the arrangement pattern of the hanging lugs 25 is not limited only thereto. That is, it is possible to arrange the hanging lugs 25 and the rods (not shown) as shown in FIG. 12, for instance.

Here, the mounting of the shroud head 5 onto the shroud 4 by use of the shroud head bolts 8 will be described hereinbelow.

First of all, for each shroud head bolt 8, the nut 13 disposed at the upper end of each shroud head bolt 8 is rotated to move the inner rod 10 downward; that is, to preliminarily increase the space between the T-bar 11 attached to the inner rod 10 and the base 18 attached to the outer pipe 9. Further, the T-bar 11 is inserted into and passed through the lug groove 12a of the lower shroud head bolt lug 12 from above the same lower shroud head bolt lug 12. After that, the inner rod 10 is rotated by 90 degrees by use of a special wrench and further the nut 13 is rotated, to move the T-bar 11 upward together with the inner rod 10. Then, the upper surface of the T-bar 11 is brought into pressure contact with the lower surface of the lower shroud head bolt lug 12 and additionally the lower surface of the flange 18a of the base 18 is brought into pressure contact with the upper surface of the upper shroud head bolt lug 19. Therefore, the upper shroud head bolt lug 19 and the lower shroud head bolt lug 12 are fastened with each other, so that shroud head 5 can be fixed to the upper portion of the shroud 4. Here, when the T-bar 11 is rotated by 90 degrees, it is possible to confirm the direction of the T-bar 11 on the basis of the direction of a rectangular projection 72 formed on the upper end of the inner rod 10. Further, the nut lock 14 is fitted to the corner portions of the nut 13 to prevent the nut 13 from being rotated.

Further, the inner rod 10 for constructing the shroud head bolt 8 is formed of Inconal 600. On the other hand, the outer pipe 9 is formed of stainless steel. Here, since the thermal expansion coefficient of the Inconel 600 is smaller than that of the stainless steel, when the inner rod 10 and the outer pipe 9 are both heated to high temperature during reactor operation, the outer pipe 9 formed of stainless steel expands largely in the axial direction thereof, as compared with the inner rod 10 formed of Inconel 600. In this case, however, the upper end of the outer pipe 9 is fixed to the upper end of the inner rod 10 by the nut 13 and moreover the lower end of the outer pipe 9 is fixed to the upper surface of the upper shroud head bolt lug 19 by the flange 18a of the base 18. Therefore, when the outer pipe 9 expands largely as compared with the inner rod 10, it is possible to fasten the shroud 4 and the shroud head 5 further firmly.

In the periodic inspection of the reactor, after the reactor has been stopped, the shroud head 5 is removed from the shroud 4. In this case, the nut lock 14 of each shroud head bolt 8 is first pushed downward, the nut 13 is rotated by use of a special wrench, to move the inner rod 10 and the T-bar 11 downward. Further, the inner rod 10 is rotated by 90 degrees, to allow the T-bar 11 to be passed through the lug groove 12a of the lower shroud head bolt lug 12. Further, the shroud head bolt 8 is unfastened by a worker stood on a fuel handling machine by use of a special long wrench.

In accordance with the above-mentioned procedure, after the shroud head bolts 8 are all unfastened, the shroud head hanging members (not shown) are engaged with a hook of a crane 59 (as shown in FIG. 6) provided on the upper portion of a rector building. After that, the crane 59 is moved so that the shroud head hanging members are located just over the shroud head 5. Here, in the case where the reactor well 62 (as shown in FIG. 6) is filled with water, when the shroud head hanging member is lowered, a wire rope 51 of the crane 59 is submerged into the water in the reactor well 62. Here, since the water in the reactor well 62 contains radioactivities, it is necessary to prevent the contaminated water. Therefore, when the shroud head hanging members are lowered, the water surface of the reactor well 62 is also lowered in accompany with the lowering of the shroud head hanging member, so that the wire rope 51 will not be submerged into the water.

As described above, after the shroud head hanging members are lowered just over the shroud head 5, the hooks of the shroud head hanging members are engaged with the hanging lugs 25 as shown in FIGS. 11(a) and 11(b), and then the wire rope 51 is wound up by the crane 59. Then, since the shroud head bolts 8 are hoisted upward together with the shroud head 5, the T-bars 11 of the shroud head bolts 8 can be passed through the lug grooves 11, so that it is possible to remove the shroud head 5 from the shroud 4. The shroud head 5 removed from the shroud head is transferred to an equipment storage pool 63 (as shown in FIG. 6). Here, whenever the shroud head 5 is hoisted upward, the water level of the reactor well 62 is moved upward in accompany with the upward movement of the shroud head 5, so that the shroud head 5 is kept transferred always in water.

In the conventional method, however, since several tens of the shroud head bolts 8 must be unfastened by use of a special long wrench from the position of the fuel handling machine, a great deal of labor is required for the bolt unfastening work. Further, when the T-bars 11 are hoisted upward through the lug grooves 12a of the lower shroud head bolt lugs 12, since the T-bars 11 are often caught by the lower portions of the lower shroud head bolt lugs 12, there exists a problem in that it is impossible to hoist the inner rods 10 smoothly. Further, when the shroud head 5 is hoisted upward or downward in the reactor well 62 (shown in FIG. 6), since it is necessary to move the water level of the reactor well 62 upward or downward in accompany with the upward or downward movement of the shroud head 5, the shroud head 5 must be moved slowly in accompany with the upward or downward movement of the water level. For the reasons as described above, a long time is inevitably required for the work for mounting and dismounting the shroud head 5 to and from the shroud 4. Therefore, there exists a problem in that a long periodic inspection period is required and thereby the availability of the nuclear power plant is lowered. In addition, there exists another serious problem in that the radiation exposure dose to the workers increases for the long periodic inspection time.

SUMMARY OF THE INVENTION

With these problems in mind, therefore, it is the object of the present invention to provide a reactor-internal equipment handling apparatus for a nuclear reactor, by which the reactor-internal equipments can be mounted to and dismounted from the reactor vessel quickly.

To achieve the above-mentioned object, the present invention provides a reactor-internal equipment handling apparatus for a nuclear reactor, hung down from above a reactor vessel to handle a reactor-internal equipment housed inside the reactor vessel, comprising: a body frame hung down from above the reactor vessel; connecting and fixing means for being releasably connected to a lug of the reactor-internal equipment; said connecting and fixing means is provided on said body frame; a guide rail provided on said body frame; and bolt wrench means for fastening and unfastening bolts; said bolt wrench means is disposed movably along said guide rail.

Further, it is preferable that said connecting and fixing means comprises: a connecting pin adapted to be removably inserted into a hanging hole formed in the lug; a cylinder for driving said connecting pin; said body frame being formed with a locating member for guiding said connecting and fixing means to the lug; and the locating members being formed with a pin insertion hole into which the connecting pin is to be inserted, respectively.

Further, it is preferable that said body frame is formed by cross-coupling a pair of hanging beams; and said connecting and fixing means is disposed at an end of said hanging beam.

Further, it is preferable that a hanging lug is disposed at each end of the hanging beam; and said guide rail is disposed on an upper surface of the hanging lugs.

Further, it is preferable that said bolt wrench means is means for fastening and unfastening shroud bolts which fix a shroud head to a shroud in the reactor vessel.

Further, it is preferable That said bolt wrench means comprises: a socket adapted to be fitted to a nut disposed on an upper end of the shroud head bolt; socket rotating means for rotating said socket; socket hoisting means for hoisting said socket together with said socket rotating means; a wrench frame to which said socket rotating means is fixed;

and roller means for movably mounting said wrench frame on said guide rail.

Further, it is preferable that said socket hoisting means comprises an air cylinder having a piston rod; said socket rotating means being provided with a motor having a pivotal axle; and said piston rod and said motor being connected by a connecting member.

Further, it is preferable that said socket rotating means further comprises a torque limiter for controlling rotational torque of the pivotal axle of the motor.

Further, it is preferable that said bolt wrench means further comprises: nut detecting means for discriminating whether said socket is fitted to the nut or not; and nut lock detecting means for discriminating whether a nut lock for said nut is fitted to said nut or not.

Further, it is preferable that said nut detecting means comprises: a lever pivotally mounted on said socket adapted to be engaged with said nut and displaced when said socket is fitted to said nut; a pin adapted to be displaced when said pin is displaced; and a nut detecting limit switch adapted to be turned on or off according to displacement of said pin.

Further, it is preferable that said nut lock detecting means comprises: a pin adapted to be pushed upward by an upper end of said nut lock; and a nut lock detecting limit switch adapted to be turned on or off according to upward and downward movement of said pin.

Further, it is preferable that reactor-internal equipment handling apparatus further comprises: a hoisting frame arranged under said body frame; a hoisting drive axle for connecting said hoisting frame to said body frame so as to be movable up and down; and hoisting frame hoisting means for hoisting said hoisting frame relative to said body frame via said hoisting drive axle; and said connecting and fixing means and said guide rail being disposed on said hoisting frame.

Further, it is preferable that said hoisting frame is formed by cross-coupling a pair of hoisting beams; and said connecting and fixing means is disposed an end of said hoisting beams.

Further, it is preferable that said body frame is formed by cross-coupling a pair of hanging beams.

Further, it is preferable that a gear box driven by a hoisting drive motor is disposed on said hanging beam; said hoisting drive axle is passed through said gear box; and an lower end of said hoisting drive axle is fixed to said hoisting beam.

Further, it is preferable that the reactor-internal equipment handling apparatus further comprises a guide plate engaged with a guide rod disposed on an inner wall surface of the reactor vessel, to prevent the reactor-internal equipment handling apparatus from being brought into contact with the inner wall surface of the reactor vessel when the reactor-internal equipment handling apparatus is hoisted in the reactor vessel.

Further, it is preferable that a plurality of said bolt wrench means are arranged on said guide rail.

Further, it is preferable that the reactor-internal equipments are a core shroud and a steam dryer.

BRIEF DESCRIPTION OF THE DRAWINGS

FIG. 3 is an enlarged side, partly cross-sectional view showing the essential portion of the reactor-internal equipment handling apparatus shown in FIG. 1;

FIG. 6 is an illustration for assistance in explaining the procedure for transferring the reactor-internal equipments to the equipment storage pool by use of the first and second embodiments of the reactor-internal equipment handing apparatus according to the present invention;

FIG. 11(a) is a view showing the shroud head; and FIG. 11(b) is a side view showing the same; and FIG. 11(c) is an enlarged side view showing the hanging lug shown in FIG. 11(b)

DETAILED DESCRIPTION OF THE PREFERRED EMBODIMENTS

First Embodiment

Figure 9:
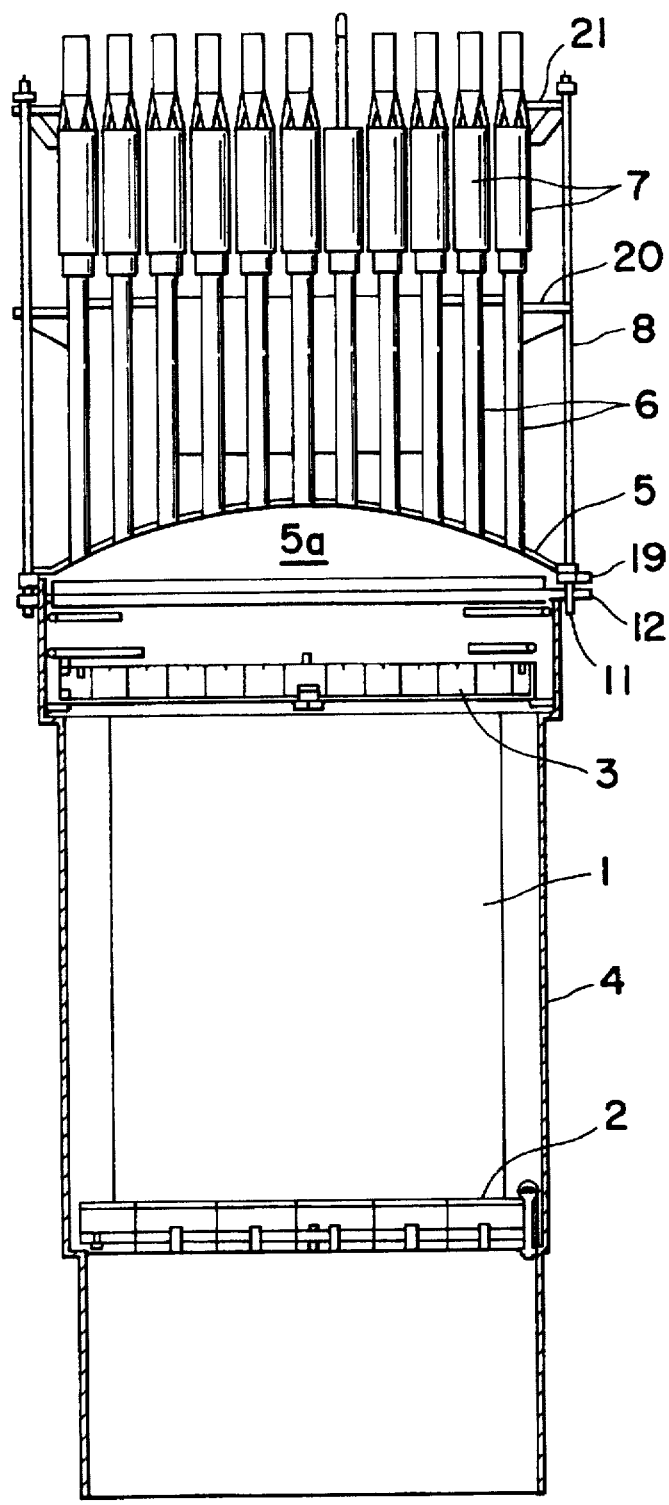
FIG. 9 is a longitudinal sectional view showing the reactor-internal equipments of the boiling water reactor.

A first embodiment of the reactor-internal equipment handling apparatus according to the present invention will be described hereinbelow with reference to FIGS. 1 to 6. Further, the same reference numerals have been retained for the similar parts or elements having the same functions as with the case of the reactor-internal equipments of the boiling water reactor shown in FIGS. 9 to 11.

Figure 1:
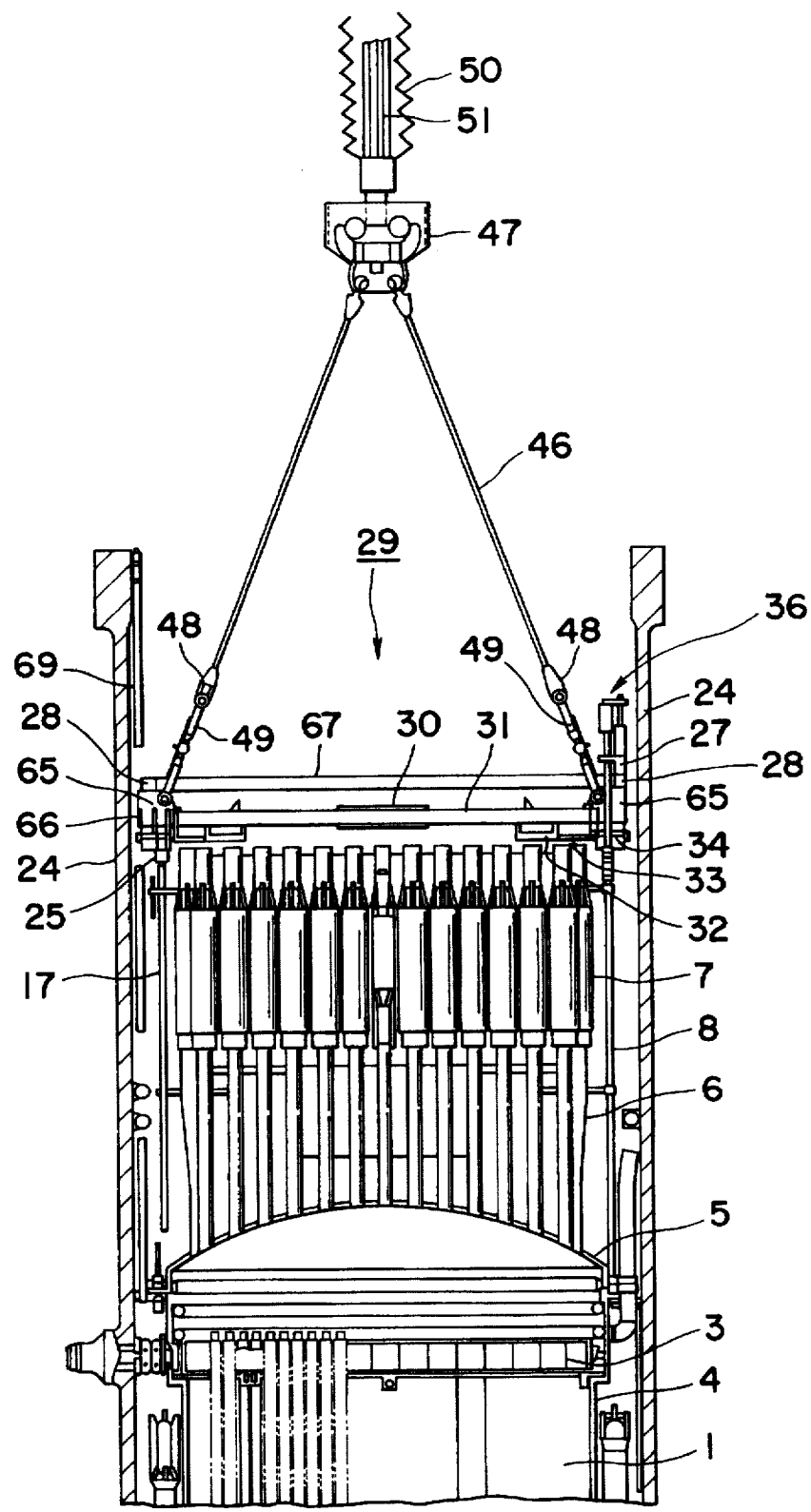
FIG. 1 is a longitudinal sectional view showing a first embodiment of the reactor-internal equipment handling apparatus according to the present invention, which is mounted in a reactor pressure vessel.
Figure 2:
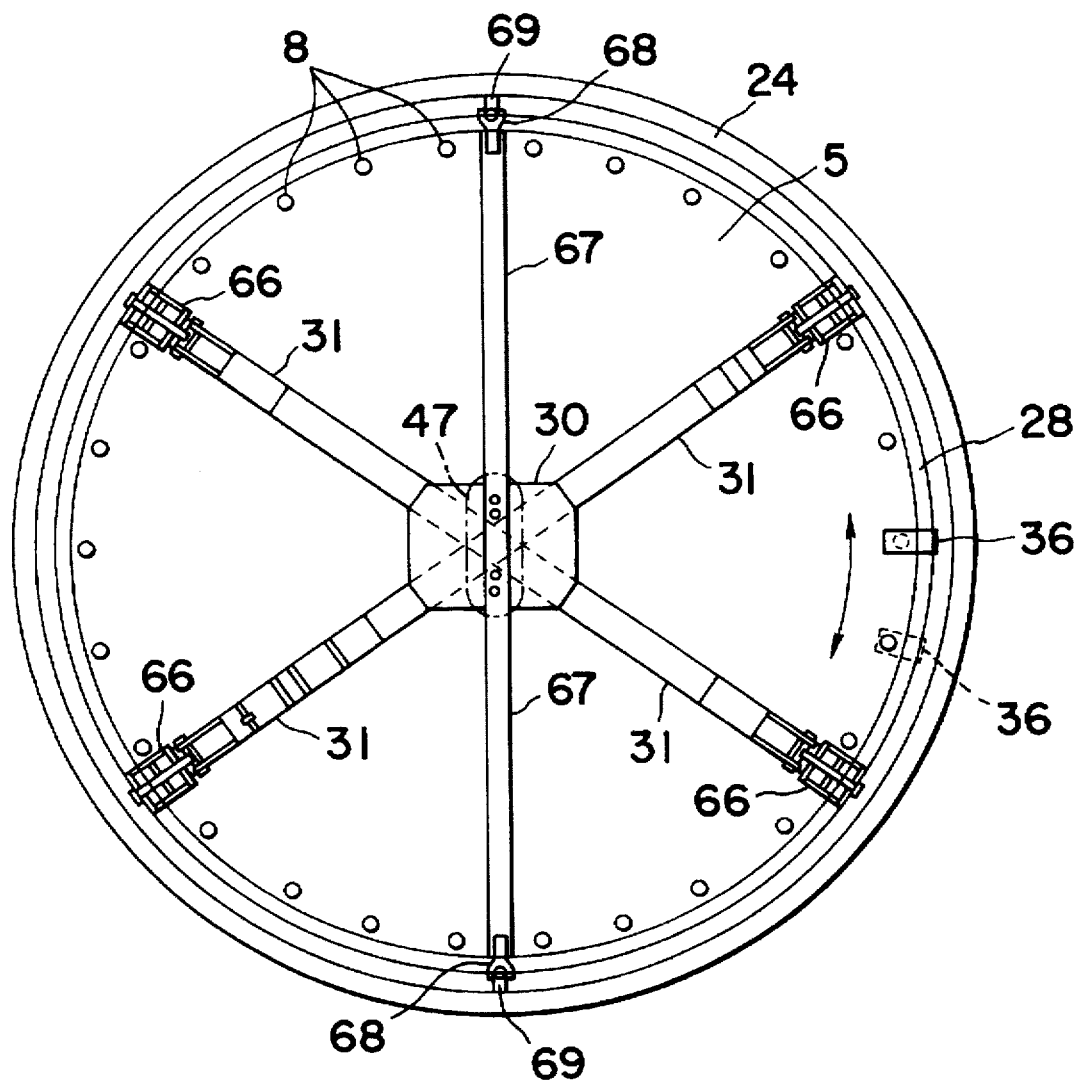
FIG. 2 is an enlarged top view showing the same reactor-internal equipment handling apparatus shown in FIG. 1.

FIG. 1 is a sectional view showing the first embodiment of the reactor-internal equipment handing apparatus 29 mounted in the reactor pressure vessel (reactor vessel) 24, and FIG. 2 is a plane view showing the same apparatus shown in FIG. 1.

Figure 12:
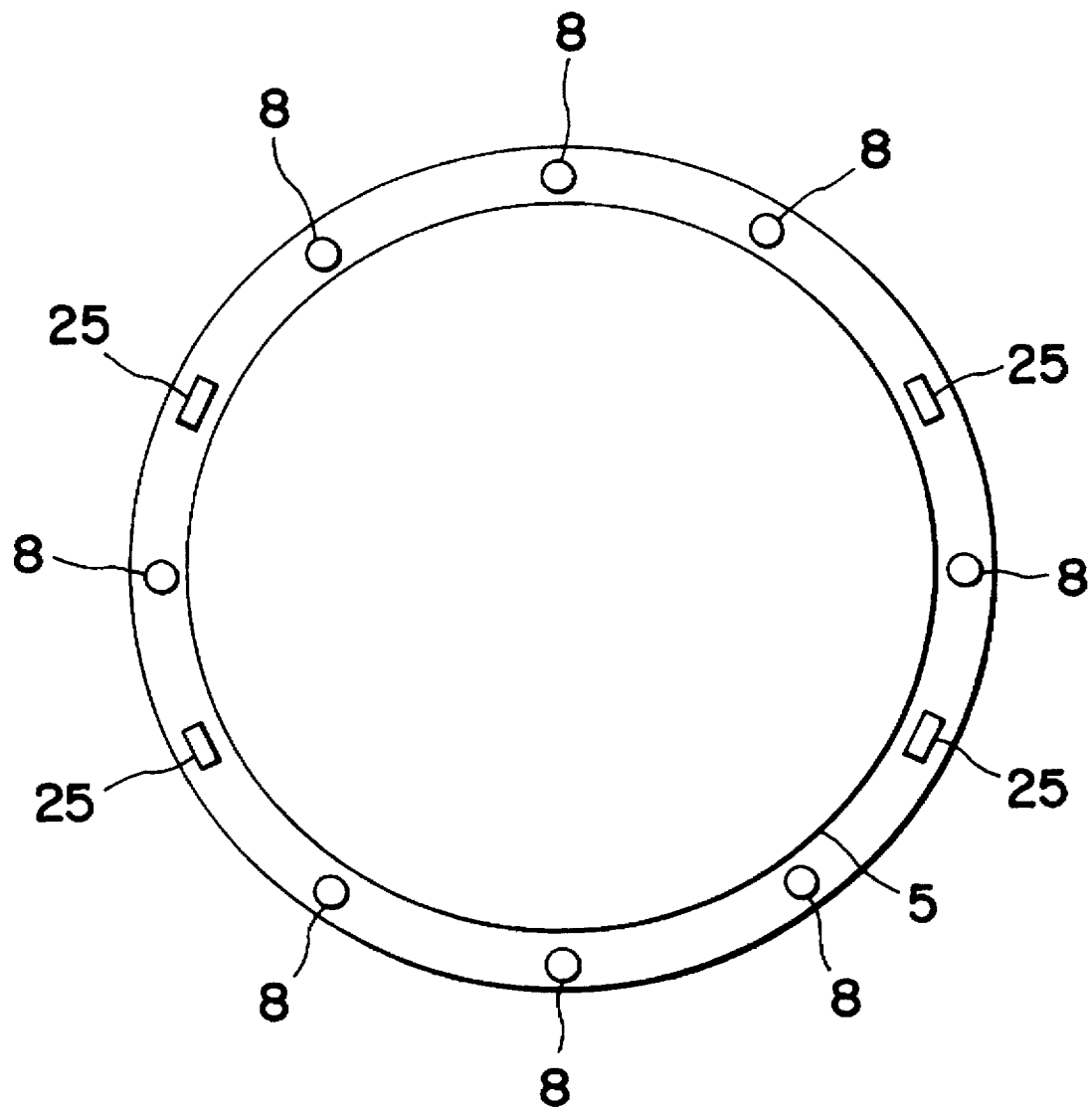
FIG. 12 is a top view showing the shroud head, in which the rods and the hanging lugs are arranged in another pattern.

As shown, the first embodiment of the reactor-internal equipment handling apparatus is provided with a pair of hanging beams (a body frame) 31 each having two hanging lugs 65 on both ends thereof. A pair of the hanging beams 31 are coupled to each other via a beam frame 30. Here, the intersection angle between the two hanging beams 31 is determined in such a way that the ends of the hanging beams 31 are located at four positions where the four hanging lugs 25 (as shown in FIGS. 11(a) to 11(c) or FIG. 12) are arranged on the upper ends of the rods 17. For instance, in the case of the first embodiment, a pair of the hanging beams 31 are crossed and coupled with each other so as to correspond to the four hanging lugs 25 arranged as shown in FIG. 12.

The hanging lugs 65 of the ends of the hanging beams 31 are connected to the ends of four hanging wires 46 via a terminal metal fitting 48 and a turn buckle 49, respectively.

Further, the other ends of the hanging wires 46 are connected to a hook box 47. This hook box 47 is fixed to a lower end of the other wire rope 51 of the crane 59 (shown in FIG. 6). Further, the wire rope 51 is enclosed by a waterproof bellow cover 50 so as not to be contaminated by radioactivities within water.

On the upper surfaces of the hanging lugs 65 of the hanging beams 31, a ring-shaped rail (circular guide rail) 28 is fixedly provided. On the circular rail 28, bolt wrench means 36 is provided so as to be moved along the circular guide rail 28. Further, in FIGS. 1 and 2, although only one bolt wrench means 36 is shown, it is also preferable to provide a plurality of the bolt wrench means 36 on the circular guide rail 28. For instance, it is possible to provide four bolt wrench means 36 for each of the four angular ranges corresponding to four circular arc portions each formed between two ends of the two hanging beams 31.

As shown in FIG. 3, a cylinder 32 is provided on the lower surface of one end of each hanging beam 31. The cylinder 32 is provided with a movable piston rod 33. A connecting pin 34 is connected to an end of the piston rod 33. Therefore, the cylinder 32, the piston rod 33 and the connecting pin 34 constitute connecting and fixing means.

Further, on the lower portion of the hanging lug a locating member 66 for receiving and locating the hanging lug 25 fixed to the upper end of the rod 17 as shown in FIG. 11(a) to 11(c) is provided. This locating member 66 is formed with two pin insertion holes 66c through which an end of the connecting pin 34 of the piston rod 33 is passed.

As shown in FIG. 2, a guide beam 67 is provided on the beam frame 30. Two guide plates 58 are attached to both ends of the guide beam 67. When the reactor-internal equipment handling apparatus 29 is hoisted by the crane (shown in FIG. 6), the guide plates 68 are engaged with two guide rods 69 fixed to the inner wall of the reactor pressure vessel 24. Therefore, when the reactor-internal equipment handling apparatus is moved up and down in the reactor pressure vessel 24, it is possible to prevent the reactor-internal equipment handling apparatus from contacting with the inner wall of the reactor pressure vessel 24.

FIG. 3 shows the bolt wrench means 36 movably provided on the circular guide rail 28 fixed on the upper surfaces of the hanging lugs 65. This bolt wrench means 36 is used to fasten and unfasten each nut 13 (submerged in water) of each of the shroud head bolts 8 automatically under remote control.

Further, the bolt wrench means 36 is provided with a wrench frame 27 having loller means 35 mounted on the circular guide rail 28. An air cylinder 37 is fixed to the wrench frame 27. The air cylinder 37 is provided with a piston rod 38 inserted thereinto. A motor 40 is connected to the piston rod 38 via a connecting member 39. A rotary shaft 40a of this motor 40 is provided with a torque limiter 41 for limiting the rotary torque of the rotary shaft 40a. The torque limiter 41 is connected to a pole 42. At the lower end of the pole 42, a socket 43 fitted to the nut 13 of the shroud head bolt 8 is provided. Therefore, the air cylinder 37, the piston rod 38 and the connecting member 39 constitute socket hoisting means, and the motor 40, the rotary shaft 40a, and the pole 42 constitute socket rotating means.

Figure 4:
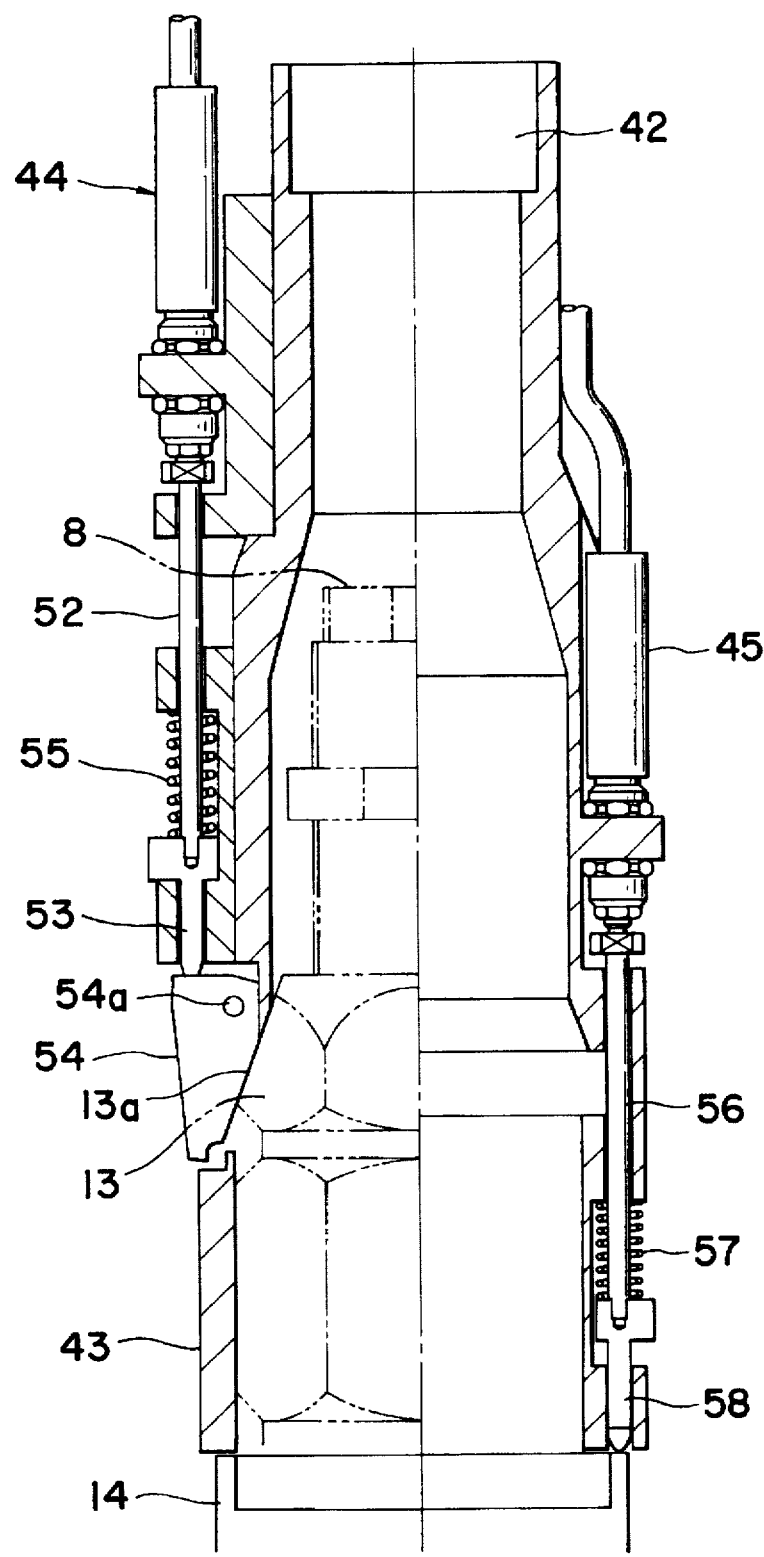
FIG. 4 is a further enlarged side, partly sectional view showing the portion denoted by A in FIG. 3.

FIG. 4 is an enlarged view showing the lower circular portion A of the pole 42 shown in FIG. 3. In FIG. 4, the socket 43 of the bolt wrench means 36 is fitted to the nut 13 of the shroud head bolt 8. Further, in the state shown in FIG. 4, the nut lock 14 of the shroud heed bolt 8 is pushed downward by the socket 43.

The socket 43 is provided with a nut detecting limit switch 44 for confirming that the socket 43 is fitted to the nut 13. Further, under this nut detecting limit switch 44, a connecting rod 52 is disposed so as to be movable up and down. A pin 53 is disposed at the lower end of the connecting rod 52. This pan 53 is urged downward by a spring force of a spring 55. The lower end of this pin 53 is in contact with the upper portion of a lever 54 pivotally supported by the socket 43 via a pivotal axle 54a. Therefore, the lever 54 is pivotally moved when brought into contact with or released from a head sloped surface 13a of the nut 13. Further, the pin 53 moves up and down in accompany with the pivotal motion of the lever 54. The nut detecting limit switch 44, the connecting rod 52, the pin 53, the lever 54, the pivotal axle 54, and the spring 55 constitute nut detecting means.

Further, the socket 43 is provided with a nut lock detecting limit switch 45 for confirming the vertical position of the nut lock 14. The nut lock detecting limit switch 45 is provided with a connecting rod 56 so as to be movable up and down. A pin 58 is disposed at the lower end of the connecting rod 56. This pin 58 is urged downward by a spring force of a spring 57. The lower end of this pin 58 is in contact with the upper portion of the nut lock 14. Therefore, the nut lock detecting limit switch 45, the connecting rod 56, the pin 58, and the spring 57 constitute nut look detecting means.

Figure 5A:
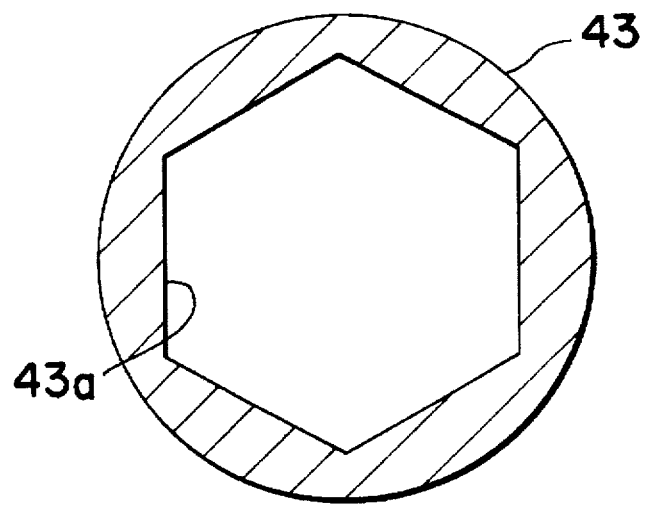
FIG. 5(a) is a cross-sectional view showing a first example of the socket shown in FIG. 4.
Figure 5B:
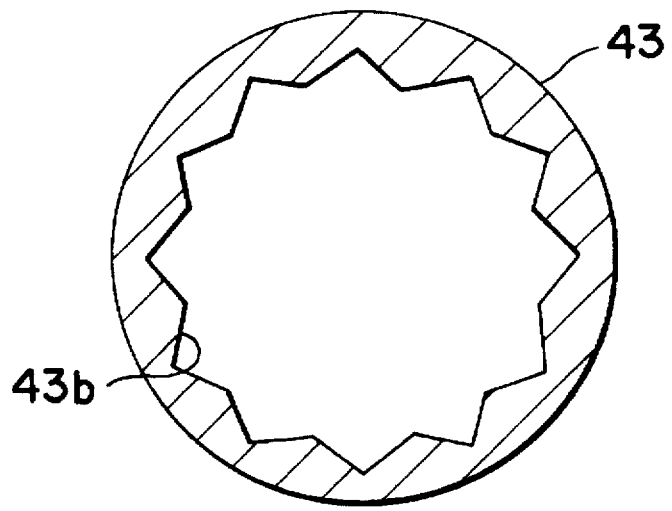
FIG. 5(b) is a cross-sectional view showing a second example of the same.

FIGS. 5(a) and 5(b) are cross-sectional views showing two different shapes of the socket 43. In the socket shown in FIG. 5(a), the socket 43 is formed with a hexagonal hole 43a; and in the socket shown in FIG. 5(b), the socket 43 is formed with a polygonal (e.g., 12 polygon) hole 43b.

The procedure of carrying out the reactor-internal equipments mounted in the reactor pressure vessel 24 by use of the first embodiment of she reactor-internal equipment handling apparatus will be described hereinbelow with reference to FIG. 6. In FIG. 6, there are shown a crane rail 60 provided on the upper portion of the reactor building; a handling floor 61; a reactor well 62; an equipment storage pool 63; a fuel storage pool 64; and a steam dryer 70 (one of the reactor-internal equipments), respectively. FIG. 6 shows the state where the steam dryer 70 has been already carried out of the reactor pressure vessel 24. But, the carrying-out procedure will be described hereinbelow, together with the steps of carrying out the steam dryer 70 mounted in the reactor pressure vessel 24.

a) First Step

After reactor operation has been stopped, an lid of the reactor pressure vessel 24 is removed.

b). Second Step

The reactor-internal equipment handling apparatus 29 is connected to the wire rope 51 of the crane 59 via the hook box 47. The crane 59 is driven to hang the reactor-internal equipment handling apparatus 29 over the reactor pressure vessel 24. Further, the crane 59 is driven to lower the reactor-internal equipment handling apparatus 29 just over the steam dryer 70 mounted in the reactor pressure vessel 24. The locating members 66 (shown in FIG. 3) of the reactor-internal equipment handling apparatus 29 are fitted to the hanging lugs 71 of the steam dryer 70. After that, the cylinders 32 (shown in FIG. 3) are driven to move forward the connecting pins 34 attached to the top ends of the piston rods 33, to pass the connecting pins 34 through the two pin insertion holes 66c of the locating member 66 and the hanging hole (not shown) of the hanging lug 71, respectively. After the reactor-internal equipment handling apparatus 29 has been linked with the steam dryer 70, the crane 59 is driven to hoist upward the reactor-internal equipment handling apparatus 29 together with the steam dryer 70 and further to transfer the steam dryer 70 to the equipment storage pool 63.

c) Third Step

After the steam dryer 70 has been moved from within the reactor pressure vessel 24 to the equipment storage pool 63, the reactor-internal equipment handling apparatus 29 is driven again to over the reactor pressure vessel 24. After that, The reactor-internal equipment handling apparatus 29 is moved downward into contact with the shroud head 5 (one of the reactor-internal equipments). In this case, the locating members 68 of the reactor-internal equipment handling apparatus 29 shown in FIGS. 1 to 3 are fitted to the hanging lugs 25 (as shown in FIGS. 11(a) to 11(c)) of the shroud head 5. Here, when the reactor-internal equipment handling apparatus 29 is lowered into the reactor pressure vessel 24, the guide plates 68 (shown in FIG. 2) of the reactor-internal equipment handling apparatus 29 are fitted to the guide rods 69 fixedly disposed on the inner wall of the reactor pressure vessel 24. By doing this, it is possible to prevent the reactor-internal equipment handling apparatus 29 from being brought into contact with the inner wall of the reactor pressure vessel 24 and further to smoothly fit the locating members 66 of the reactor-internal equipment handling apparatus 29 to the hanging lugs 25 disposed on the upper ends of the rods 17, respectively. After that, the cylinders 32 are driven to move forward the connecting pins 34 attached to the top ends of the piston rods 33, to pass the connecting pins 34 through the two pin insertion holes 66c of the locating member 66 and the hanging hole 26 (as shown in FIG. 11(c)) of the hanging lug 25, respectively.

d) Fourth Step

As described above, after the reactor-internal equipment handling apparatus 29 has been linked with the shroud head 5, the shroud head bolts 8 are unfastened by use of the bolt wrench means 36 as shown in FIGS. 3 and 4 in accordance with the following procedure.

First, the bolt wrench means 36 is driven along the circular guide rail 28 to a position over one of the shroud head bolts 8. Then, the air cylinder 37 is driven to lower the piston rod 38 together with the motor 40 and the pole 42. Then, the socket 43 disposed at the lower end of the pole 42 is fitted to the nut 13 of the shroud head bolt 8, and further the lower end of the socket 43 is brought into pressure contact with the upper end of the nut lock 14. Here, since the nut lock 14 urged downward by the socket 43 is moved downward against a spring force of the spring 16, the fitting between the nut 13 and the nut lock 14 is released. In this case, the lever 54 shown in FIG. 4 is brought into contact with the sloped surface 13a of the nut 13 and thereby displaced outward, so that the pin 53 is displaced upward against the spring force of the spring 55. Then, since the pin 53 is moved upward end further the connecting rod 52 is also moved upward, the nut detecting limit switch 44 is turned on, so that it is possible to confirm that the socket 43 has been firmly fitted to the nut 13 correctly. On the other hand, since the pin 58 shown in FIG. 4 is brought into contact with the upper portion of the nut lock 14 end thereby displaced upward against the spring force of the spring 57, the nut lock detecting limit switch 54 is also turned on via the connecting rod 56.

Figures 10A, 10B:
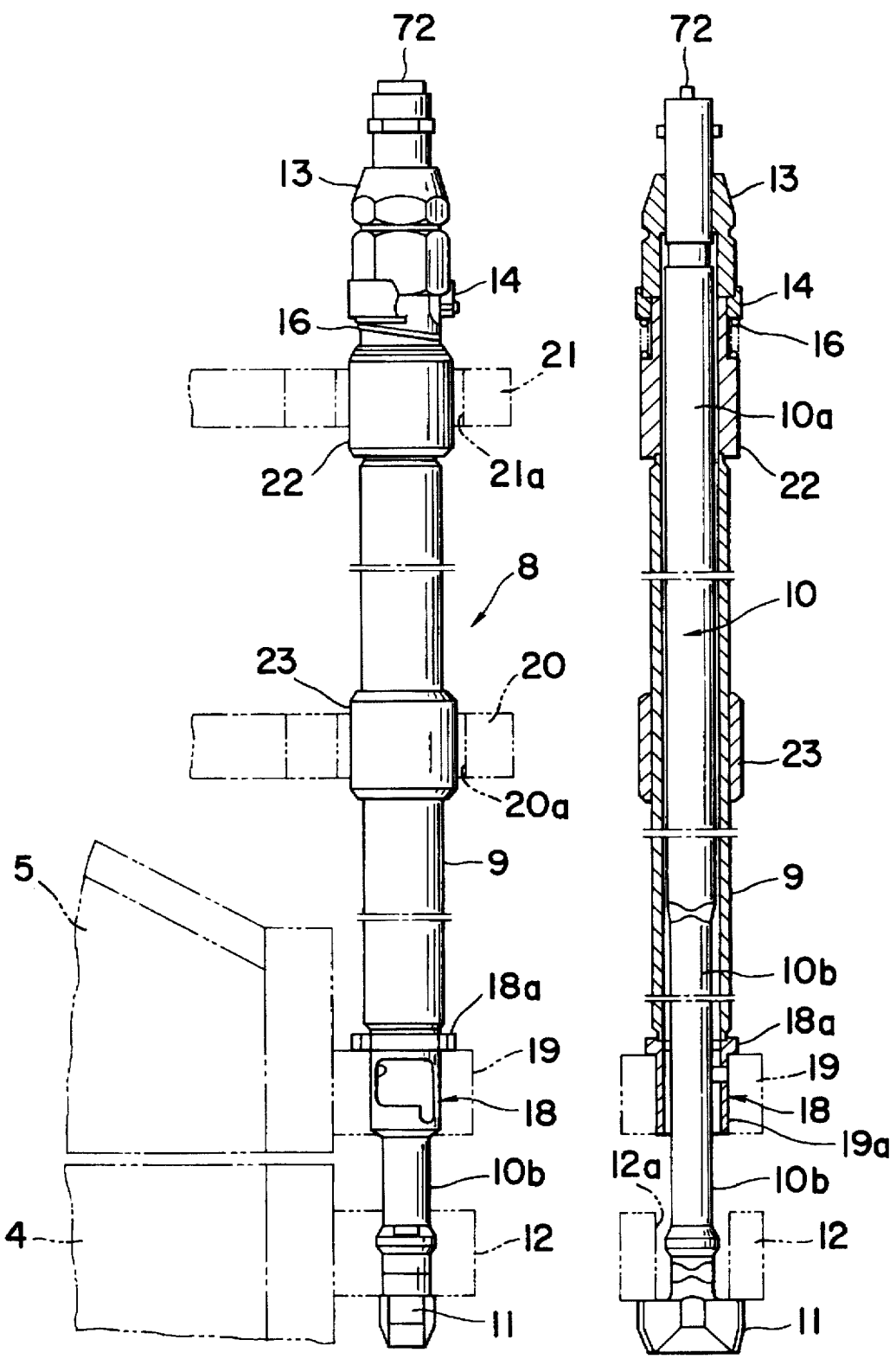
FIG. 10(a) is a side view showing the shroud head bolt shown in FIG. 9.
FIG. 10(b) is a side, partly sectional view showing the shroud head bolt shown in FIG. 10(a)

As described above, after the socket 43 of the bolt wrench means 36 has been fitted to the nut 13 of the shroud head bolt 8, the motor 40 shown in FIG. 3 is driven rotate the pole 42 and the socket 43 together. In this case, the rotating torque of the motor 40 can be controlled under optimum condition by the torque limiter 41 disposed at the rotary axle 40a of the motor 40, so that it is possible to prevent the nut 13 and the other members from being broken by an excessive rotating torque of the motor 40. When the socket 43 is rotated, since the nut 13 rotates, the inner rod 10 shown in FIG. 10 is moved downward, so that the shroud head bolt 8 can be unfastened. On the other hand, when the shroud head bolt 8 is required to be fastened, it is possible to fasten the shroud head bolt 8 by rotating the socket 43 in the reverse direction by use of the motor 40. Further, it is possible to confirm the direction of the T-bar 11 disposed at the lower end of the inner rod 10 by the direction of the rectangular projection 72 disposed on the upper end of the inner rod 10.

As described above, after the shroud head bolt 8 has been unfastened, the air cylinder 37 shown in FIG. 3 is driven to move the piston rod 38 upward, to move the socket 43 upward via the pole 42. When the socket 43 is moved upward, since the engagement between the sloped portion 13a of the nut 13 and the lever 54 of the nut detecting means is released, the pin 53 and the connecting rod 52 both move downward, so that the nut detecting limit switch 44 is turned off. On the other hand, when the socket 43 is moved upward, the pin 58 and the connecting rod 56 of the nut lock detecting means move also downward, so that the nut lock detecting limit switch 45 is also turned off.

Here, since the nut lock 14 is urged upward by the spring 16 as shown in FIG. 10, at the start when the socket 43 moves upward, the nut lock 14 is also moved upward together with the socket 43. Therefore, the timing at which the nut lock detecting limit switch 45 is turned off is delayed from the timing at which the nut detecting limit switch 44 is turned off. On the other hand, when the socket 43 is moved upward, in case the nut lock 14 is caught by the corner portion of the nut 13 and thereby the nut lock 14 cannot be moved upward, the pin 58 and the connecting rod 56 of the nut lock detecting means are immediately moved downward, to turn off the nut lock detecting limit switch 45. Therefore, it is possible to confirm whether the nut lock 14 is correctly fitted to the nut 13, by confirming the timings at which the nut detecting limit switch 44 and the nut lock detecting limit switch 45 are turned off, respectively.

e) Fifth Step

After the socket 43 of the bolt wrench means 36 has been moved upward, the shroud heed bolt 8 is rotated along the circular guide rail 28, and the succeeding shroud head bolt 8 is unfastened in the same procedure as the fourth step. Further, in the case where four bolt wrench means 36 are disposed on the circular guide rail 28, it is possible to unfasten four shroud head bolts at the same time.

f) Sixth Step

After all the shroud head bolts 8 have been unfastened by repeating the above-mentioned fourth and fifth steps, the crane 59 as shown in FIG. 6 is driven to hoist the shroud head 5 together with the reactor-internal equipment handling apparatus 29, and further the crane 59 is moved to transfer the shroud head 5 to the equipment storage pool 63, in order to perform a predetermined work (e.g., refueling work).

After the refueling work has been completed, the shroud head 5 and the steam dryer 70 can be returned from the equipment storage pool 63 to the predetermined positions within the reactor pressure vessel 24 and then mounted therein, by performing a series of the steps opposite to the above-mentioned steps.

As described above, in the first embodiment of the reactor-internal equipment handling apparatus according to the present invention, a number of shroud head bolts 8 of the shroud head 5 can be unfastened and fastened automatically and quickly by use of the bolt wrench means 36 rotatably disposed on the circular guide rail 28. Therefore, it is possible to mount and dismount the shroud head 5 to and from the reactor pressure vessel 24 in a short time. For this reason, it is possible not only to reduce the radiation exposure dose to the worker markedly but also to shorten the periodic inspection period, with the result that it is possible to improve the availability of the nuclear power plant.

Further, since the reactor-internal equipment handling apparatus 29 is provided with both the function of unfastening and fastening the shroud head bolts 8 and the function of carrying the shroud head 5, immediately after the shroud head bolts 8 have been unfastened, the shroud head 5 can be carried out of the reactor pressure vessel 24 quickly, with the result that it is possible to shorten the carrying-out work time markedly.

Further, since the reactor-internal equipment handling apparatus 29 can be used to carry out not only the shroud head 5 but also the steam dryer 70, it is possible to perform the carrying work of both the shroud head 5 and the steam dryer 70 continuously and smoothly, with the result that it is possible to shorten the work time markedly.

Second Embodiment

The second embodiment of the reactor-internal equipment handling apparatus according to the present invention will be described hereinbelow with reference to FIGS. 7 and 8, in which the same reference numerals have been retained for similar parts or elements having the same functions as with the case of the first embodiment.

Figure 7:
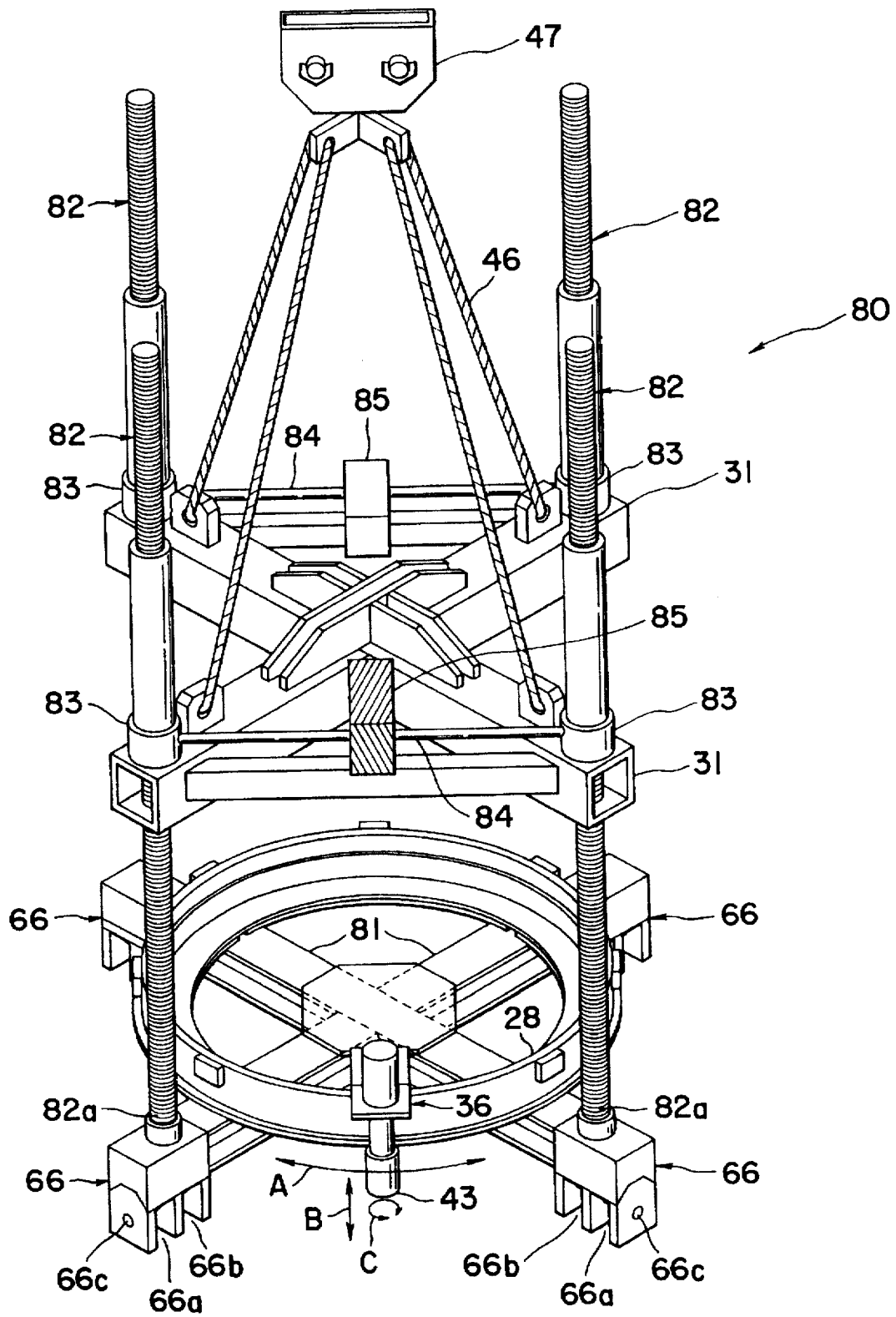
FIG. 7 is a perspective view showing the second embodiment of the reactor-internal equipment handing apparatus according to the present invention.
Figure 8:
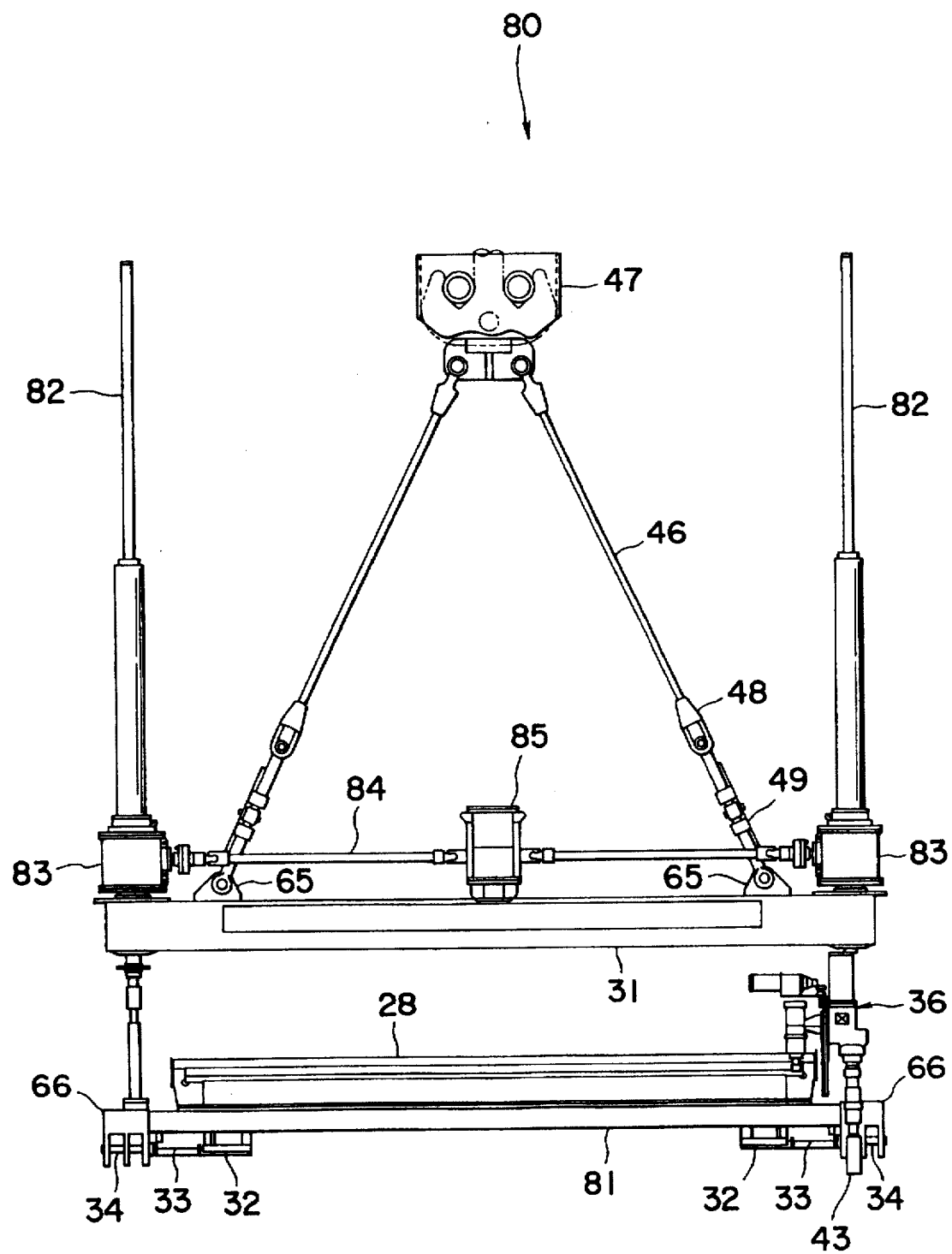
FIG. 8 is a front view showing the second embodiment of the reactor-internal equipment handing apparatus according to the present invention shown in FIG. 7.

As shown in FIGS. 7 and 8, in the reactor-internal equipment handing apparatus 80, a pair of cross-connected hoisting beams (hoisting frame) 81 are disposed below the hanging beams (body frame) 31 having hanging lugs 65. To the upper surface of the ends of the hoisting beams 81, four lower ends 82a of four hoisting drive axles 82 formed with roller screw are fixed. Each hoisting drive axle 82 is passed through each gear box 83 disposed on the upper surface of an end of each hanging beam 31, and each gear box 83 is linked with a hoisting drive motor 85 via a gear drive axle 84. The hoisting drive axle 82, the gear box 83, the gear drive axle 84, and the hoisting drive motor 85 constitute hoisting frame hoisting means. Therefore, when the power of the hoisting drive motor 85 is transmitted to the gear box 83 via the gear drive axle 84 to drive the gear box 83, it is possible to hoist the hoisting beams 81 together with the hoisting drive axle 82 relative to the hanging beams.

Further, the circular guide rail 28 is fixedly disposed on the upper surface of the hoisting beams 81, and the bolt wrench means 36 is mounted on the circular guide rail 28 so as to be movable in the arrow direction A in FIG. 7. The bolt wrench means 36 is provided with the socket 43. The socket 43 is movable upward and downward in the arrow direction B and further rotatable in the arrow direction C in FIG. 7. A locating member 66 is disposed at each end of each hoisting beam 81. Each locating member 66 is formed with two guide groove 66a fitted to the hanging lug 71 (shown in FIG. 6) of the steam dryer 70 and another guide groove 65b fitted to the hanging lug 25 (shown in FIG. 11) of the shroud head 5. Further, as shown in FIG. 8, the cylinder 32 having the piston rod 33 is disposed on the lower surface of an end of each hoisting beam 81. The connecting pin 34 attached to an end of the piston rod 33 is inserted into or removed from the pin insertion holes 66c formed in the locating member 66 shown in FIG. 7. The cylinder 32, the piston rod 33, and the connecting pin 34 constitute connecting and fixing means.

The procedure of carrying out the reactor-internal equipments mounted in the reactor pressure vessel 24 by use of the second embodiment of the reactor-internal equipment handling apparatus 80 will be described hereinbelow with reference to FIG. 6 again. Here, the same procedure as that of the first embodiment is partially omitted herein.

Further, although FIG. 6 shows the state where the steam dryer 70 has been already carried out of the reactor pressure vessel 24, the carrying-out procedure will be described hereinbelow, together with the steps of carrying out the steam dryer 70 mounted in the reactor pressure vessel 24.

a) First Step

After the reactor operation has been stopped, the lid of the reactor pressure vessel 24 is removed, and then the reactor well 62 is started to be filled with water.

b) Second Step

The reactor-internal equipment handling apparatus is connected to the wire rope 51 of the crane 59 via the hook box 47. The crane 59 is driven over the reactor pressure vessel 24 to hang the reactor-internal equipment handling apparatus 80. Further, when the reactor well 62 is being filled with water, the crane 59 is driven to lower the reactor-internal equipment handling apparatus 80 just over the steam dryer 70 mounted in the reactor pressure vessel 24. The locating members 66 (shown in FIG. 7) of the reactor-internal equipment handling apparatus 80 are fitted to the hanging lugs 71 of the steam dryer 70. After that, the cylinders 32 shown in FIG. 8 are driven to move forward the connecting pins 34 attached to the top ends of the piston rods 33, to pass the connecting pins 34 through the pin insertion holes 66c of the locating members 66 and the hanging holes (not shown) of the hanging lugs 71. After the reactor-internal equipment handling apparatus 80 has been linked with the steam dryer 70, the crane 59 is driven to hoist upward the reactor-internal equipment handling apparatus 80 together with the steam dryer 70 and further to transfer the steam dryer 70 to the equipment storage pool 63. Further, when the steam dryer 70 is hoisted by driving the crane 59, it is possible to hoist the hoisting beams 81 relative to the hanging beams 31 by driving the hoisting drive motors 85 to move the hoisting drive axles 82 upward.

c) Third Step

After the steam dryer 70 has been transferred from within the reactor pressure vessel 24 to the equipment storage pool 63, the reactor-internal equipment handling apparatus 80 is returned to over the reactor pressure vessel 24. After that, the reactor-internal equipment handling apparatus 80 is moved downward into contact with the shroud head 5. In this case, the guide grooves 66b of the locating members 66 of the reactor-internal equipment handling apparatus 80 shown in FIG. 7 are fitted to the hanging lugs 25 (as shown in FIGS. 11(a) to 11(c)) of the shroud head 5. After that, the cylinders 32 are driven to move the connecting pins 34 attached to the ends of the piston rods 33 forward to pass the connecting pins 34 through the pin insertion holes 66 of the locating members 66 and the hanging holes 26 (shown in FIG. 11) of the hanging lugs 25. Here, when the third step is being performed, the reactor well 62 has been already filled with water. Here, in order to prevent the hook box 47 from being submerged into the contaminated water, in this third step, it is necessary to previously increase the space between the hanging beams 31 and the hoisting beams 81 by moving the hoisting drive axles 82 downward.

d) Fourth Step

As described above, after the reactor-internal equipment handling apparatus 80 has been linked with the shroud head 5, the shroud head bolts 8 are unfastened by use of the bolt wrench means 36 as shown in FIGS. 3 and 4 in accordance with the same procedure as that of the first embodiment.

e) Fifth Step

A plurality of the shroud head bolts 8 are unfastened in sequence by the same procedure as the above fourth step, by moving the shroud head bolt wrench means 36 along the circular guide rail 28.

f) Sixth Step

After all the shroud head bolts 8 have been unfastened by repeating the above-mentioned fourth and fifth steps, the hoisting drive motors 55 are driven to move the hoisting drive axles 82 and further to hoist the hoisting beams 81 relative to the hanging beams 31. Further, in this case, it is possible to hoist the entire reactor-internal equipment handling apparatus 80 upward by driving both the hoisting drive motors 85 and the crane 59. As described above, by moving upward the hoisting beams 81 relative to the hanging beams 31, it is possible to hoist the shroud head 5 together with the reactor-internal equipment handling apparatus 80, and further to move the crane 59 so that the shroud head 5 can be transferred to the equipment storage pool 63 in water. After that, the predetermined work, for instance such as refueling work is performed.

After the refueling work has been completed, the shroud head 5 and the cream dryer 70 can be returned from the equipment storage pool 63 to the predetermined positions within the reactor pressure vessel 24 and then mounted therein, by performing a series of the steps opposite to the above-mentioned steps.

As described above, in the second embodiment of the reactor-internal equipment handling apparatus 80 according to the present invention, since the hoisting beams 81 are provided under the hanging beams 31 so as to be movable up and down, it is possible to securely prevent the hook box 47 from being submerged into the contaminated water, even after the reactor well 62 has been filled with water, in addition to the effect obtained by the first embodiment of the reactor-internal equipment handling apparatus 29. Accordingly, when the shroud head 5 is moved up and down relative to the reactor pressure vessel 24, it is unnecessary to change the water level of the reactor well 62 in accompany with the vertical movement of the shroud head 5 when the shroud head 5 is being hoisted, with the result that the carrying work of the shroud head 5 can be made quickly.

As described above, in the reactor-internal equipment handling apparatus according to the present invention, since the bolts for fastening the reactor-internal equipment can be fastened or unfastened automatically and quickly by use of bolt wrench means movably disposed on the guide rail, it is possible to mount and demount the reactor-internal equipment to and from the reactor pressure vessel accurately in a short time. As a result, it is possible not only to reduce the radiation exposure dose to the workers markedly but also to shorten the period required for the periodic inspection. As a result, the availability of the nuclear power plant can be improved markedly.

What is claimed is:

1. A reactor-internal equipment handling apparatus, hung down from above a reactor vessel to handle a reactor-internal equipment housed inside the reactor vessel, comprising:

a body frame hung down from above the reactor vessel;

connecting and fixing means for being releasably connected to a lug of the reactor-internal equipment; said connecting and fixing means is provided on said body frame;

a guide rail provided on said body frame; and bolt wrench means for fastening and unfastening bolts; said bolt wrench means is disposed movably along said guide rail.

2. The reactor-internal equipment handling apparatus of claim 1, wherein said connecting and fixing means comprises:

a connecting pin adapted to be removably inserted into a hanging hole formed in the lug;

a cylinder for driving said connecting pin;

said body frame being formed with a locating member for guiding said connecting and fixing means to the lug; and the locating members being formed with a pin insertion hole into which the connecting pin is to be inserted.

3. The reactor-internal equipment handling apparatus of claim 1, wherein:

said body frame is formed by cross-coupling a pair of hanging beams: and said connecting and fixing means is disposed at an end of said hanging beam.

4. The reactor-internal equipment handling apparatus of claim 3, wherein a hanging lug is disposed at each end of the hanging beam, and said guide rail is disposed on an upper surface of the hanging lugs.

5. The reactor-internal equipment handling apparatus of claim 1, wherein said bolt wrench means is means for fastening and unfastening shroud bolts which fix a shroud head to a shroud in the reactor vessel.

6. The reactor-internal equipment handling apparatus of claim 5, wherein said bolt wrench means comprises:

a socket adapted to be fitted to a nut disposed on an upper end of the shroud head bolt;

socket rotating means for rotating said socket;

socket hoisting means for hoisting said socket together with said socket rotating means;

a wrench frame to which said socket rotating means is fixed; and roller means for movably mounting said wrench frame on said guide rail.

7. The reactor-internal equipment handling apparatus of claim 6, wherein said socket hoisting means comprises an air cylinder having a piston rod;

said socket rotating means being provided with a motor having a pivotal axle; and said piston rod and said motor being connected by a connecting member.

8. The reactor-internal equipment handling apparatus of claim 7, wherein said socket rotating means further comprises a torgue limiter for controlling rotational torque of the pivotal axle of the motor.

9. The reactor-internal equipment handling apparatus of claim 6, wherein said bolt wrench means further comprises:

nut detecting means for discriminating whether said socket is fitted to the nut or not; and nut lock detecting means for discriminating whether a nut lock for said nut is fitted to said nut or not.

10. The reactor-internal equipment handling apparatus of claim 9, wherein said nut detecting means comprises:

a lever pivotally mounted on said socket adapted to be engaged with said nut and displaced when said socket is fitted to said nut;

a pin adapted to be displaced when said pin is displaced; and a nut detecting limit switch adapted to be turned on or off according to displacement of said pin.

11. The reactor-internal equipment handling apparatus of claim 10, wherein said nut lock detecting means comprises:

a pin adapted to be pushed upward by an upper end of said nut lock; and a nut lock detecting limit switch adapted to be turned on or off according to upward and downward movement of said pin.

12. The reactor-internal equipment handling apparatus of claim 1, which further comprises:

a hoisting frame arranged under said body frame;

a hoisting drive axle for connecting said hoisting frame to said body frame so as to be movable up and down; and hoisting frame hoisting means for hoisting said hoisting frame relative to said body frame via said hoisting drive axle; and said connecting and fixing means and said guide rail being disposed on said hoisting frame.

13. The reactor-internal equipment handling apparatus of claim 12, wherein:

said hoisting frame is formed by cross-coupling a pair of hoisting beams; and said connecting and fixing means is disposed at an end of said hoisting beam.

14. The reactor-internal equipment handling apparatus of claim 13, wherein said body frame is formed by cross-coupling a pair of hanging beams.

15. The reactor-internal equipment handling apparatus of claim 14, wherein:

a gear box driven by a hoisting drive motor is disposed on said hanging beam;

said hoisting drive axle is passed through said gear box; and an lower end of said hoisting drive axle is fixed to said hoisting beam.

16. The reactor-internal equipment handling apparatus of claim 1, which further comprises a guide plate engaged with a guide rod disposed on an inner wall surface of the reactor vessel, to prevent the reactor-internal equipment handling apparatus from being brought into contact with the inner well surface of the reactor vessel when the reactor-internal equipment handling apparatus is hoisted in the reactor vessel.

17. The reactor-internal equipment handling apparatus of claim 1, wherein a plurality of said bolt wrench means are arranged on said guide rail.

18. The reactor-internal equipment handling apparatus of claim 1, wherein the reactor-internal equipments are a core shroud and a steam dryer.

* * * * *